US011070599B2

(12) United States Patent
Evans

(10) Patent No.: US 11,070,599 B2
(45) Date of Patent: Jul. 20, 2021

(54) BROADCASTING AND CONTENT-SHARING SYSTEM

(71) Applicant: Kyle Evans, Langhorne, PA (US)

(72) Inventor: Kyle Evans, Langhorne, PA (US)

(73) Assignee: KAE, Inc., Langhorne, PA (US)

( * ) Notice: Subject to any disclaimer, the term of this patent is extended or adjusted under 35 U.S.C. 154(b) by 0 days.

(21) Appl. No.: 16/788,938

(22) Filed: Feb. 12, 2020

(65) Prior Publication Data

US 2020/0259876 A1  Aug. 13, 2020

Related U.S. Application Data

(60) Provisional application No. 62/804,583, filed on Feb. 12, 2019.

(51) Int. Cl.
*H04L 29/06* (2006.01)
*A63F 13/843* (2014.01)
*H04N 7/15* (2006.01)

(52) U.S. Cl.
CPC ........ *H04L 65/4038* (2013.01); *A63F 13/843* (2014.09); *H04L 65/4076* (2013.01); *H04N 7/152* (2013.01)

(58) Field of Classification Search
CPC ............ H04L 65/4038; H04L 65/4076; H04L 65/602; A63F 13/843; H04N 7/152; G06Q 50/00
See application file for complete search history.

(56) References Cited

U.S. PATENT DOCUMENTS

| 9,716,918 B1* | 7/2017 | Lockton | ........... H04N 21/25841 |
| 10,051,600 B1* | 8/2018 | Zhong | ..................... G06F 3/167 |
| 2014/0149513 A1* | 5/2014 | Grennan | ........ G06Q 10/063112 |
| | | | 709/204 |

* cited by examiner

*Primary Examiner* — Kim T Nguyen
(74) *Attorney, Agent, or Firm* — Snell & Wilmer L.L.P.

(57) ABSTRACT

A system and method may relate to a broadcasting and content-sharing system. The system may be configured to allow a user to upload, save, record, create, and/or share content with other users of the system. Additionally, users of the system may communicate with one another by, for example, transmitting content between one another, such as audio (e.g., music), video, text, or the like, and/or participating in real-time audio and/or video communication, for example, to collaborate artistically, battle (e.g., take turns singing, rapping, or playing an instrument, trying to best the other participant), view a live (i.e., in real time) or prerecorded performance as an audience member, and/or the like.

20 Claims, 5 Drawing Sheets

FIG. 3

BROADCASTING AND CONTENT-SHARING SYSTEM

CROSS REFERENCE TO RELATED APPLICATIONS

This application is a nonprovisional of, and claims priority to and the benefit of, U.S. Provisional Patent Application Ser. No. 62/804,583, filed Feb. 12, 2019 and entitled "BROADCASTING AND CONTENT-SHARING SYSTEM," which is hereby incorporated by reference.

FIELD

The present disclosure generally relates to a system for broadcasting content, for example audio and/or video, and sharing content between system users.

BACKGROUND

Sharing artistic content, such as music and/or performance video and/or audio, for the purposes of collaboration, competition, entertainment, and/or the like, is valuable to facilitate the advancement and cultivation of artistic talent and expression. Therefore, it would be valuable to have a system allowing the sharing of various content forms, communication and feedback between users, and/or the ability for real time broadcasting and/or communication between system users, further allowing viewers to observe available content.

SUMMARY

Systems and methods are disclosed relating to a broadcasting and content-sharing system. In various embodiments, the system may be configured to allow a user to upload, save, record, create, revise, contribute to, broadcast, display, perform, and/or otherwise share content with other users of the system. Additionally, users of the system may communicate with one another by, for example, transmitting content between one another, such as audio (e.g., music), video, text, or the like, and/or participating in real-time audio and/or video communication, for example, to collaborate artistically, battle (e.g., take turns singing, rapping, or playing an instrument, trying to best the other participant), view a live (i.e., in real time) or previous performance as an audience member or viewer, and/or the like. Even further, the system may allow users to create and/or sell advertisement materials, merchandise, and other items related to themselves or other users or content on the system. The user transmitting or sharing content (e.g., music, video, text, merchandise, advertising materials, or the like) may choose which other users may view or receive the shared items.

A system, method, and article of manufacture (collectively, "the system") are disclosed relating to a broadcasting production system. In various embodiments, the system may be configured to perform operations including, receiving, by a processor, instructions to create content and/or an interaction request; receiving, by the processor, content details associated with the content to be created or shared; capturing, by the processor, the content; and/or presenting, by the processor, the content to viewing users. In various embodiments, the operations may comprise connecting users or facilitating, by the processor, communication or interaction between users to share content, for example, by receiving, by the processor, content information or details for an interaction between users, transmitting or presenting, by the processor, an interaction request from one user to another user, and/or receiving, by the processor, an acknowledgement of the interaction request from the receiving user, wherein the acknowledgement indicates whether a user accepts or declines the interaction request. In various embodiments, the operations may comprise displaying a first user and a second user on a split-screen display, such that the users may see and/or hear each other, and viewers of the display (i.e., users of system not participating in the communications between users), may see and/or hear both participating users. In various embodiments, the operations may comprise timing, by the processor, interactions or turns during an interaction between users, and adjusting, by the processor, audio and/or video in response to a timer expiring, or another user being prepared to share content (e.g., two users take turns performing for a certain number of rounds, and during the first user's turn, audio and/or video for the first user is turned on such that at least a portion of the first user's content is captured (i.e., recorded, broadcasted, displayed for viewing, or the like), and the audio and/or video for the second user is turned off such that the second user's at least a portion of content is not captured (e.g., the second user's audio content is muted), and vice versa during the second user's turn).

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures. Elements with like element numbering throughout the figures are intended to be the same.

FIG. 3 illustrates a display screen on a web client depicting another exemplary GUI of a broadcasting production system, in accordance with various embodiments.

DETAILED DESCRIPTION

The detailed description of various embodiments herein makes reference to the accompanying drawings, which show the exemplary embodiments by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
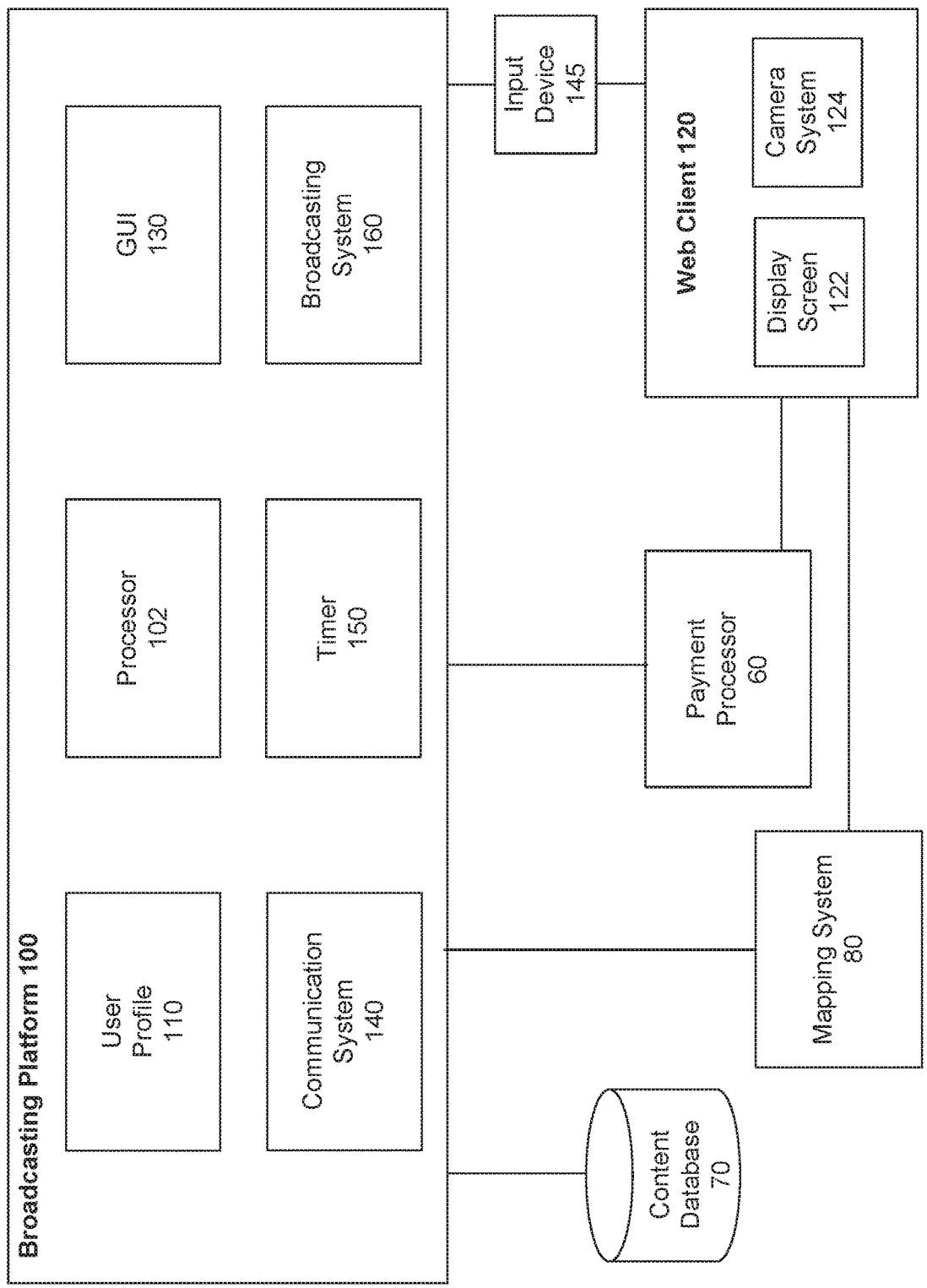
FIG. 1 illustrates an exemplary broadcasting production system, in accordance with various embodiments.

With reference to FIG. 1, a broadcasting production system 50 is illustrated, in accordance with various embodiments. System 50 may allow a user to easily and efficiently record, create, revise, contribute to, store, share, broadcast, transmit, or otherwise share content to other users therein, in addition to additional functions described herein. A user of system 50 may be an artist (e.g., a musician or other entertainer) or a person who enjoys entertainment (e.g., fans of users of system 50 who are artists). Users may create and/or upload content to share. The content may be anything that may be posted, broadcasted, streamed, displayed, performed, or otherwise viewed and/or listened to from a web client 120 (e.g., music, video, audio/visual content, text, still images such as paintings or photographs, multimedia content, and/or the like). For example, a live broadcast of a musical performance is content. Users may post or otherwise make such content available for other users of system 50 to view (e.g., via download, streaming, etc.). The users of system 50 who post content may customize their content and the descriptions thereof, as well as dictate such content's availability to other users of system 50 (e.g., certain content may only be available to certain users or user types). Furthermore, users of system 50 may communicate with one another, for example, leaving comments (e.g., text, audio, and/or visual comments) on posted content, private or public messages, and/or real time communication via text, video, and/or audio. In various embodiments, system 50 may comprise software integrated with and utilized by a web client 120 (e.g., a personal computer, smartphone, tablet, or the like), such as a computer program and/or mobile application.

In various embodiments, system 50 may comprise a payment processor 60, a content database 70, a mapping system 80, a broadcasting platform 100, a web client 120, and/or an input device 145. In various embodiments, any or all of the components of system 50 may be integrated, and/or in electronic communication, with one another via one or more application programming interfaces (APIs). System 50 and/or any of the components comprised therein may be computer-based, and may comprise a processor (e.g., processor 102), a tangible non-transitory computer-readable memory, and/or a network interface. Instructions stored on the tangible non-transitory memory may allow system 50, or the components therein (e.g., broadcasting platform 100), to perform various functions, as described herein. In various embodiments, one or more processors (e.g., processor 102) may control, preform, and/or facilitate the functions of all components of system 50.

In various embodiments, web client 120 may incorporate hardware and/or software components. For example, web client 120 may comprise a server appliance running a suitable server operating system (e.g., MICROSOFT INTERNET INFORMATION SERVICES or, "IIS"). Web client 120 may be any device that allows a user to communicate with a network (e.g., a personal computer, personal digital assistant (e.g., IPHONE®, BLACKBERRY®), tablet, cellular phone, kiosk, and/or the like). Web client 120 may be in electronic communication with broadcasting platform 100, payment processor 60, content database 70, mapping system 80, and/or input device 145. In various embodiments, web client 120 may comprise an input device 145 (i.e., a physical or digital button). Web client 120 may allow the user of system 50 to interact with the other components of system 50. For example, web client 120 may comprise display screen 122, which may display a GUI 130 provided by broadcasting platform 100. Display screen 122 displaying GUI 130 may allow the user to select input device(s) 145 to send a signal to system 50 indicating a desired action by system 50. In various embodiments, any action performed by a user through system 50 and/or broadcasting platform 100 may be communicated to broadcasting platform 100 and performed by a processor (e.g., processor 102). Web client 120 may further comprise camera system 124, which may be configured to digitally capture an image from outside web client 120. As used herein, "image" may include static images as well as video. Web client 120 may also comprise a microphone to capture audio data (e.g., during the recording and/or streaming of content from a user of broadcasting platform 100 comprising audio).

Web client 120 includes any device (e.g., personal computer, mobile device, etc.) which communicates via any network, for example such as those discussed herein. In various embodiments, web client 120 may comprise and/or run a browser, such as MICROSOFT® INTERNET EXPLORER®, MOZILLA® FIREFOX®, GOOGLE® CHROME®, APPLE® Safari, or any other of the myriad software packages available for browsing the internet. For example, the browser may communicate with a server via network by using Internet browsing software installed in the browser. The browser may comprise Internet browsing software installed within a computing unit or a system to conduct online transactions and/or communications. These computing units or systems may take the form of a computer or set of computers, although other types of computing units or systems may be used, including laptops, notebooks, tablets, handheld computers, personal digital assistants, set-top boxes, workstations, computer-servers, mainframe computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. In various embodiments, browser may be configured to display an electronic channel.

In various embodiments, payment processor 60 may be associated with any payment service provider or transaction account issuer, and may be configured to facilitate transactions. Payment processor 60 may comprise hardware and/or software capable of storing, analyzing, and/or processing information and data. Payment processor 60 may comprise a server appliance running a suitable server operating system (e.g., MICROSOFT INTERNET INFORMATION SERVICES or, "IIS") and having database software (e.g., ORACLE) installed thereon. Payment processor 60 may be in electronic communication with web client 120 and/or broadcasting platform 100. Payment processor 60 may store transaction accounts and transaction account information associated with users and associated user profiles 110 on broadcasting platform 100. In various embodiments, payment processor 60 may accept payment from a user of broadcasting platform 100 purchasing merchandise from another user and/or transfer payment to an account of the selling user.

In various embodiments, mapping system 80 may incorporate hardware and/or software components capable of storing, analyzing, and/or processing information and data. For example, mapping system 80 may comprise a server appliance running a suitable server operating system (e.g., Microsoft Internet Information Services or, "IIS") and database software (e.g., ORACLE) installed thereon. Mapping system 80 may be in communication with web client 120 and/or broadcasting platform 100. In various embodiments, mapping system 80 may be configured to provide digital maps displaying geographic areas and performance locations within the geographic areas (e.g., concert or other performance venues, and/or any other locations able to be shown on a digital map which may be associated with the sharing, performing, and/or displaying content), and/or may be configured to provide digital information to web client 120 in order to display such digital maps with geographic areas and performance locations. In various embodiments, the performance locations may be stored on any database containing geographic locations, such as mapping system 80, content database 70, and/or broadcasting platform 100, and retrieved therefrom in order to display the digital map(s) performance locations (e.g., in response to a request by a user of broadcasting platform 100).

In various embodiments, broadcasting platform 100 may comprise hardware and/or software capable of storing data and/or analyzing information. Broadcasting platform 100 may comprise a server appliance running a suitable server operating system (e.g., MICROSOFT INTERNET INFORMATION SERVICES or, "IIS") and having database software (e.g., ORACLE) installed thereon. Broadcasting platform 100 may be in electronic communication with web client 120, payment processor 60, content database 70, mapping system 80, and/or input device 145 via a network and/or respective APIs. As such, broadcasting platform 100 may be able to communicate, and/or share information, with web client 120, payment processor 60, content database 70, and/or mapping system 80. In various embodiments, payment processor 60, content database 70, mapping system 80, and/or input device 145 may be comprised within broadcasting platform 100. Broadcasting platform 100 may provide the functions described herein regarding creating, sharing, broadcasting, displaying, streaming, and/or storing content, facilitating communications between users, etc.

In various embodiments, broadcasting platform 100 may comprise various components configured to perform the functions of broadcasting platform 100, such as content capture, content broadcasting, transmitting communications, and/or the like. However, the components of broadcasting platform 100 are discussed for illustrative and exemplary purposes only. Therefore, broadcasting platform 100 may comprise any components therein configured to perform the functions discussed in relation to those performed by broadcasting platform 100 and its components.

In various embodiments, platform may comprise a user profile 110 (e.g., associated with each user of system 50 and/or broadcasting platform 100), processor 102, GUI 130, a communication system 140, a timer 150, and/or a broadcasting system 160. Each of the foregoing may allow broadcasting platform 100 to provide the various functionalities described herein.

In various embodiments, GUI 130 may take different forms and/or comprise various features, and may be presented on display screen 122 of web client 120 to a user of broadcasting platform 100. Input device(s) 145 may be an aspect of GUI 130 displayed on display screen 122 which, in response to being selected, allows a user of system 50 and/or broadcasting platform 100 to produce an input signal received by processor 102, which may command processor 102 to perform or facilitate performance of an operation. For example, input device 145 may be a digital button displayed on display screen 122 (e.g., a touch screen) which may be selected by tapping the screen on a touch screen or selecting input device 145 with a computer mouse, and/or input device 145 may be a physical button to input information. GUI 130 may also be configured to present to users of system 50 and/or broadcasting platform 100 content belonging to the same user or other users, such that the users may view such content.

In various embodiments, communication system 140 may facilitate the communication between two or more user profiles 110 on broadcasting platform 100. Communication system 140 may comprise a server appliance running a suitable server operating system and having database software installed thereon. Communication system 140 may electronically or logically link two or more user profiles 110 on broadcasting platform 100 such that content may be transferred between them, such as video, audio, text, images, photographs, and/or the like, and any electronic messages comprising the same. The communication system 140 may also facilitate or limit the access of messages or other communications to certain users (e.g., private or only available to one or more users, or public). Messages and/or content (e.g., content in messages) sent on platform may also be stored in broadcasting platform 100, communication system 140, content database 70, and/or any other suitable location.

In various embodiments, broadcasting system 160 may facilitate the broadcasting of content by a user having a user profile 110 on broadcasting platform 100 to one or more viewers (i.e., other users on broadcasting platform 100). Broadcasting system 160 may comprise a server appliance running a suitable server operating system and having database software installed thereon. Broadcasting system 160 may provide the ability to transmit (i.e., broadcast) content, such as audiovisual content, to multiple users who wish to view the broadcasted content. The content broadcasted may be live (i.e., in real time) or pre-recorded, and may be available for viewing by other users of broadcasting platform 100 through their respective user profiles 110. The user broadcasting content may include desired information, supplemental content (e.g., supplementary and/or complementary text, music, etc.), visual adjustments (e.g., filters), or other components to the broadcast by selecting and/or adjusting such components while creating a broadcast. The user broadcasting content may also dictate the availability of a broadcast to certain users, for example, make the broadcast only available to certain users (e.g., a certain group such as the broadcasting user's followers), make the broadcast unavailable to certain users, or make the broadcast public. A broadcast may also be set so that a user may watch the broadcast on-demand, by the user selecting the broadcast on the broadcasting user's user profile 110.

In various embodiments, a user profile 110 may be associated with at least one user of broadcasting platform 100. Therefore, broadcasting platform 100 may comprise multiple user profiles 110 (e.g., one associated with each user). User profile 110 may comprise any information or data about a user of broadcasting platform 100 that describes an attribute associated with the consumer (e.g., a preference, an interest, demographic information, a talent, personally identifying information, and/or the like). Additionally, user profile 110 may comprise content created by and/or associated with the user (e.g., audio and/or video of musical performances, which may have been broadcasted by broadcasting system 160), and/or performance information associated with performances of the content (e.g., number of plays of certain content, location of performance, contributors to the content, content title, description, etc.). For example, with additional reference to FIG. 2, user profile 110 may comprise a digital space in broadcasting platform 100 which stores information associated with user profile 110, and various GUIs 130 to display information (which may be selected and/or designed by the user).

Figure 2:
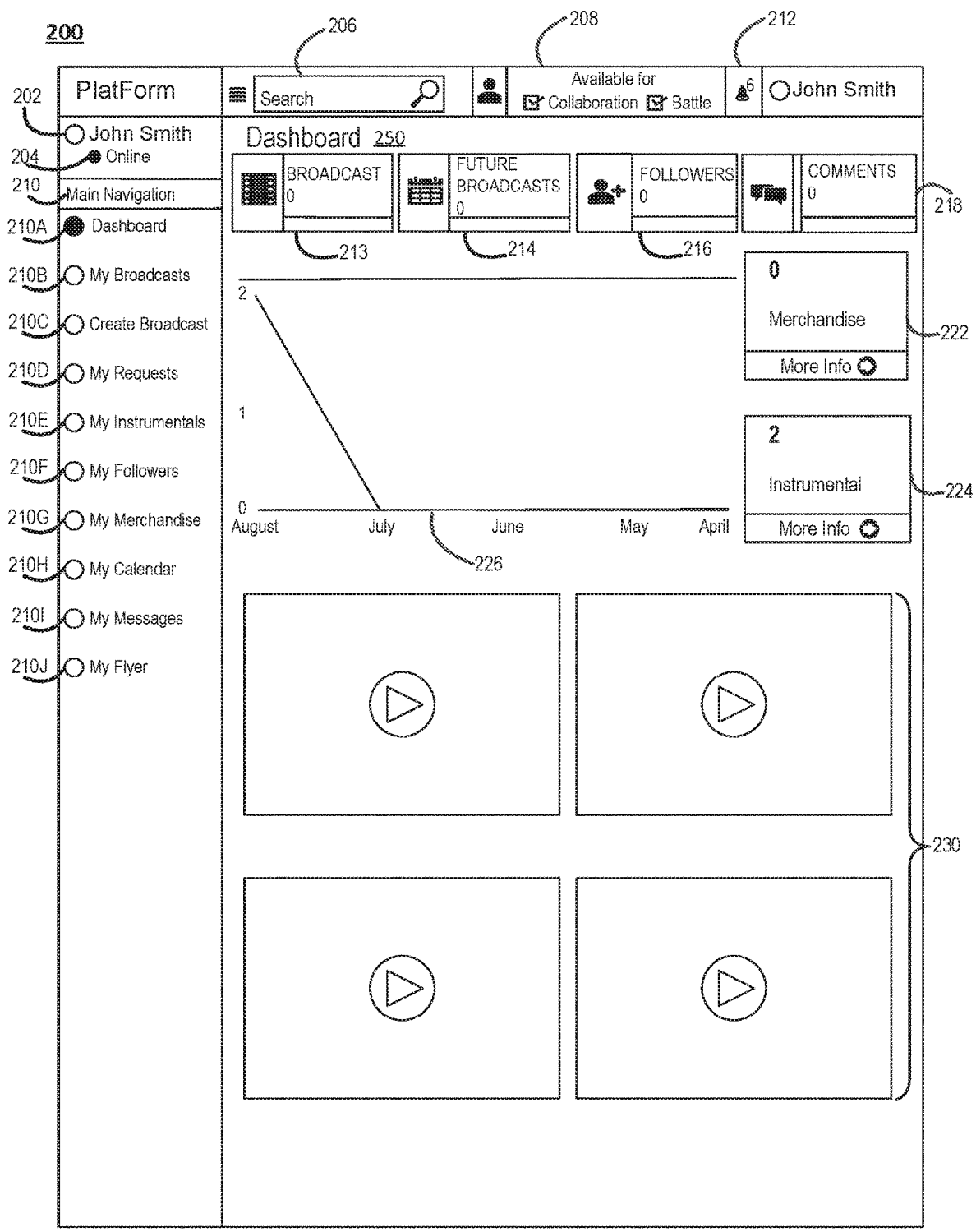
FIG. 2 illustrates a display screen on a web client depicting an exemplary graphical user interface (GUI) of a broadcasting production system, in accordance with various embodiments.

FIG. 2 depicts a view of a user profile 200 (an example of user profile 110), as displayed on GUI 130 by display screen 122. User profile 200 is one view (via GUI 130) that a user may see when viewing a user profile 110. User profile 200 may be accessed by the user through the respective user profile 110, by the user logging into the respective user profile 110 on broadcasting platform 100, for example, by presenting (e.g., typing in) user access credentials (e.g., a username and password, or a social login using a social network profile, such as a profile on FACEBOOK®).

As depicted in FIG. 2, in accordance with various embodiments, user profile 200 displayed through GUI 130 and display screen 122 may comprise a user identity 202 (in this case, "John Smith"), which may be located in any suitable location on GUI 130 and/or in more than one location on GUI 130 (e.g., also in the top right corner as viewed in FIG. 2). A symbol representing the user, or a picture of the user, may also be displayed on user profile 200. In various embodiments, user profile 200, as displayed on GUI 130, may comprise a presence indicator 204, which may indicate whether the user is presently logged into user profile 110, active, and/or online, for example, through some word and/or symbol (e.g., a filled-in shape, a shape of a certain color, and/or the like may indicate that the user is online, while an empty shape, a shape of a difference color, and/or the like may indicate that the user is offline). The user profile 110 displayed through GUI 130 and display screen 122 may further comprise other information about the user such as an availability indicator 208, which may indicate whether the user is available for (e.g., at the present time), or open to, collaboration, battle, or another interaction with another user of broadcasting platform 100. In various embodiments, user profile 200 may display a notification symbol 212, which may indicate if the user has any messages, collaboration or battle requests, likes, comments, or the like. The user may be able to see what types of notifications have been received by clicking on notification symbol 212 (an example of input device 145). Processor 102 may receive the input from clicking on notification symbol 212 and, in response, display the types of notifications and/or content associated with one or more notifications. User profile 200 may further comprise a search bar 206 in any suitable location in user profile 200 on GUI 130. The user may type terms into search bar 206 to search for desired users, artists, broadcasts, displays, live shows, available gigs (i.e., jobs, such as a contract musician or the like), streaming, or broadcasts, shows/events in certain locations, artists looking to collaborate or battle, or anything else which may be comprised in or provided on broadcasting platform 100. For example, the user may search for live performance events on a certain date in a specified geographic area in search bar 206, and processor may display a list of locations and/or a map (via mapping system 80) with locations of the search results.

In various embodiments, the view of user profile 200 may present a summary of and/or accessibility to information related to the user and respective user profile 110. In various embodiments, user profile 200 may comprise a main navigation pane 210 displayed on GUI 130 for selection of available information in user profile 200 (and user profile 110) to be displayed to the user. For example, main navigation pane 210 may be located on an edge of GUI 130 and/or display screen 122 such that main navigation pane 210 is out of the way of selected information to be displayed on GUI 130 and display screen 122 (e.g., dashboard 250 displayed in response to selecting dashboard tab 210A in main navigation pane 210) and does not have to be relocated in response to GUI 130 and display screen 122 displaying other information. Main navigation pane 210 may comprise tabs, which the user may select to see information associated with the selected tab. The tabs of main navigation pane 210 may resemble a list, for example, or the types of available content and/or information associated with a user's user profile 110 for the user to view.

In various embodiments, main navigation pane 210 may comprise a dashboard tab 210A, which may, for example, show various information, such as a representative statistic(s) for other tabs of main navigation pane 210, which may serve as a summary of user profile 110. In various embodiments, main navigation pane 210 may comprise a broadcasts tab 210B, which may, for example, show information associated with the user's broadcasts, such as broadcasts created by the user, which may be available for viewing, the dates created or broadcasted or available for broadcasting, the number of views, likes, shares, comments, etc. for each broadcast or all broadcasts, the content of the comments, the number of broadcasts (during a period of time), who may watch specific broadcasts, etc. The user may have the option to download a broadcast or delete a broadcast. In various embodiments, main navigation pane 210 may comprise a create broadcast tab 210C, through which, for example, the user may create a broadcast and create information and descriptions about the broadcast. In various embodiments, main navigation pane 210 may comprise a requests tab 210D, which may, for example, show the user's requests to other users (or other users' requests to the present user) for collaboration, battle, comments, or the like. A request may be displayed and/or searchable to other users indicating what type of interaction the user is looking for (e.g., a collaboration, a battle, criticism, editing/revising, or the like). In various embodiments, main navigation pane 210 may comprise an instrumentals tab 210E, which may, for example, show information associated with the user's instrumentals (i.e., instrumental tracks), such as instrumentals created by the user, which may be available for viewing/listening, the dates created, performed, or broadcasted or available for performance, the number of views/listens, likes, shares, comments, etc. for each instrumental or all instrumentals, the content of the comments, the number of instrumentals (during a period of time), who may watch, play, or utilize in their own content specific instrumentals, etc. The user may make instrumental tracks available for enjoyment or use by other users of broadcasting platform 100 to create additional content, by indicating to broadcasting platform 100 and/or processor 102 which users, groups of users, or user type have such permissions to the instrumentals. In various embodiments, main navigation pane 210 may comprise a followers tab 210F, which may, for example, show the other users of broadcasting platform 100 who are following the user of user profile 200. Following another user may comprise a user, through the respective user profile 110, selecting another user (e.g., by clicking on the user, a "follow" button, or the like) such that the selecting user's user profile 110 receives notification (e.g., a notification associated with notification symbol 212) in response to the followed user taking an action, such as posting content (e.g., a video, broadcast, live performance, advertising material, merchandise, a statement in text, video, or audio form, or the like). In various embodiments, main navigation pane 210 may comprise a merchandise tab 210G, which may provide information related to the merchandise offered by the user for purchase by or trade with other users. Information associated with merchandise tab 210G may comprise total number of items sold, gross revenue, payments due, and/or the like. In various embodiments, main navigation pane 210 may comprise a calendar tab 210H, which may show the dates of upcoming and/or past events, and/or a calendar with days, weeks, months, and years, with events displayed on the calendar on or at the appropriate time, day, week, month, etc. In response to a user indicating interest in a certain event (e.g., by selecting the event or a link related thereto), the event may be placed under calendar tab 210H. In various embodiments, main navigation pane 210 may comprise a messages tab 210I, which, in response to being selected, GUI 130 may display messages sent and/or received by the user through user profile 200, and/or information related thereto. GUI 130 may also present the ability to transmit messages (e.g., a video, text, and/or audio messages) to other user profiles 110 of broadcasting platform 100 by, for example, selecting the desired user profile 110 to receive the message, entering the message content into the appropriate portion of GUI 130, and sending. Messages, and information related thereto, may be sent via communication system 140 in broadcasting platform 100. In various embodiments, main navigation pane 210 may comprise a flyer tab 210J, which may display a flyer for (i.e., representing) the user, the user's broadcasts, merchandise, or other content. For example, the flyer may be a flyer for a performance which may be broadcasted on broadcasting platform 100 by broadcasting system 160, or a flyer for an album created by the user. The user may design a flyer to be used on or associated with the associated user profile 110 or with associated content, adapt or customize a template flyer provided by broadcasting platform 100, and/or select a pre-made flyer for use. Accordingly, the user associated with user profile 200 may select any of tabs 210A-210J to view the associated information in user profile 110 (each of tabs 210A-210J is an example fo an input device 145).

As depicted in FIG. 2, dashboard tab 210A is selected (which may be indicated by a bar or circle of a different color around dashboard tab 210A, the associated symbol being filled in or otherwise different than the symbols of other tabs in main navigation pane 210, or the like). Accordingly, dashboard 250 may display representative statistics or information for other information associated with the user profile 110 (e.g., the information associated with other tabs 210B-210J). For example, dashboard 250 may display various thumbnails associated with representative statistics or information associated with the user profile 200.

As depicted in FIG. 2, broadcast thumbnail 213 may show how many broadcasts the user has completed and/or how many broadcasts are available. Future broadcasts thumbnail 214 may indicate the number of broadcasts that are scheduled in the future by the user, and/or by users who the present user is following. Followers thumbnail 216 may indicate the number of other users of broadcasting platform 100 are following the present user, as discussed above. Comments thumbnail 218 may display the number of comments the user has received in user profile 200 (e.g., via communication system 140), and/or another metric, such as the number of unread comments received. Merchandise thumbnail 222 may show the number of available merchandise items the user is offering for sale through user profile 200, the number of merchandise items sold, and/or any other relevant metrics. Instrumental thumbnail 224 may show the number of instrumental tracks (e.g., content with audio and/or video, but no lyrics), the number of plays or views, or the like. In various embodiments the user may customize which thumbnails are shown on dashboard 250 (or in which order), which summary or representative metrics will be shown in the respective thumbnail, or the like. For example, regarding comments thumbnail 218, the user may elect that comments thumbnail display the number of total comments, unread comments, and/or comments from followers.

To see more specific or in-depth information associated with any of the topics of the thumbnails 213-224, the user may select the thumbnail (e.g., by clicking on the thumbnail) (each thumbnail may be an example of an input device 145), and/or a portion thereof (e.g., a portion displaying "More Info," as depicted in FIG. 2). Processor 102 may receive the user's selection and the space of GUI 130 occupied by dashboard 250 in FIG. 2 may be changed to show more information associated with the selected thumbnail. In various embodiments, selecting a thumbnail may cause the same display on GUI 130 as the selection of a corresponding tab 210A-210J. For example, selecting merchandise thumbnail 222 may display the same in-depth information as selecting merchandise tab 210G.

In various embodiments, a graphical representation (e.g., graph 226) may visually depict a user's activity, or an aspect of the user's activity on user profile 110 and/or broadcasting platform 100. The user may select which information to display on graph 226, for example, by selecting a thumbnail or tab of main navigation pane 210.

In various embodiments, as part of dashboard 250, various content may be displayed for easy access, for example in content zone 230. Content zone 230 may, for example, display the most popular pieces of content from the user (e.g., broadcasts, videos, music, photographs, images, paintings, etc.). The most popular content may be determined by the greatest number of views, plays, likes, comments, and/or the like. Along with each piece of content, certain information may also be displayed in content zone 230 (e.g., under the respective image of display for the content), such as the number of views, plays, likes, comments, etc. The user may select which content, which type of content, random or rotating content, the most popular content, or any other suitable or desired content to display in content zone 230. The user may view the content displayed in content zone 230, such as by selecting (e.g., clicking on) the image associated with the desired content to play the video and/or listen to the audio. Content zone 230 may also display the content other users see when they visit the home or welcome screen of the user profile 110. In various embodiments, content zone 230 may display trending content (e.g., in the respective user profile 200 and/or throughout broadcasting platform 100), suggested content for the user of user profile 200 to view or hear, and/or the like.

When a user visits another user's profile 110 on broadcasting platform 100, the visiting user may also select input devices 145 similar to tabs 210A-210J and/or thumbnails 213-224 to view the information associated with each of the same as discussed herein. A user may dictate to whom their associated user profile 110 is available, or to whom certain information on their associated user profile 110 is available, and processor 102 may receive the allowed (or prohibited) user's identification information (e.g., name, username, picture, user profile identifier, or other unique identifier) or user characteristic (e.g., a follower of a user, part of a certain group or band, having a certain personal characteristic, or the like). In response to a user trying to visit another user's user profile 110, processor 102 may analyze the user profile 110 of the visiting user, and if any of the associated user information matches the allowed user identification information or user characteristic, the user may be allowed to view the user profile, and vice versa. Conversely, in response to a user trying to visit another user's user profile 110, processor 102 may analyze the user profile 110 of the visiting user, and if any of the associated user information matches the prohibited user identification information or user characteristic, the user may be prevented from viewing the user profile, and vice versa. Access to a user profile may also be limited to certain types of information and content in a similar manner (e.g., a certain user or group is only allowed to view instrumentals).

Overall, the information viewable by the user of a user profile 110, or by other users, is customizable by the user associated with the respective user profile 110. As a further example of user profile 110 customization, a user may post a "song of the day," which, for example, may represent the user's current mood.

Figure 3:
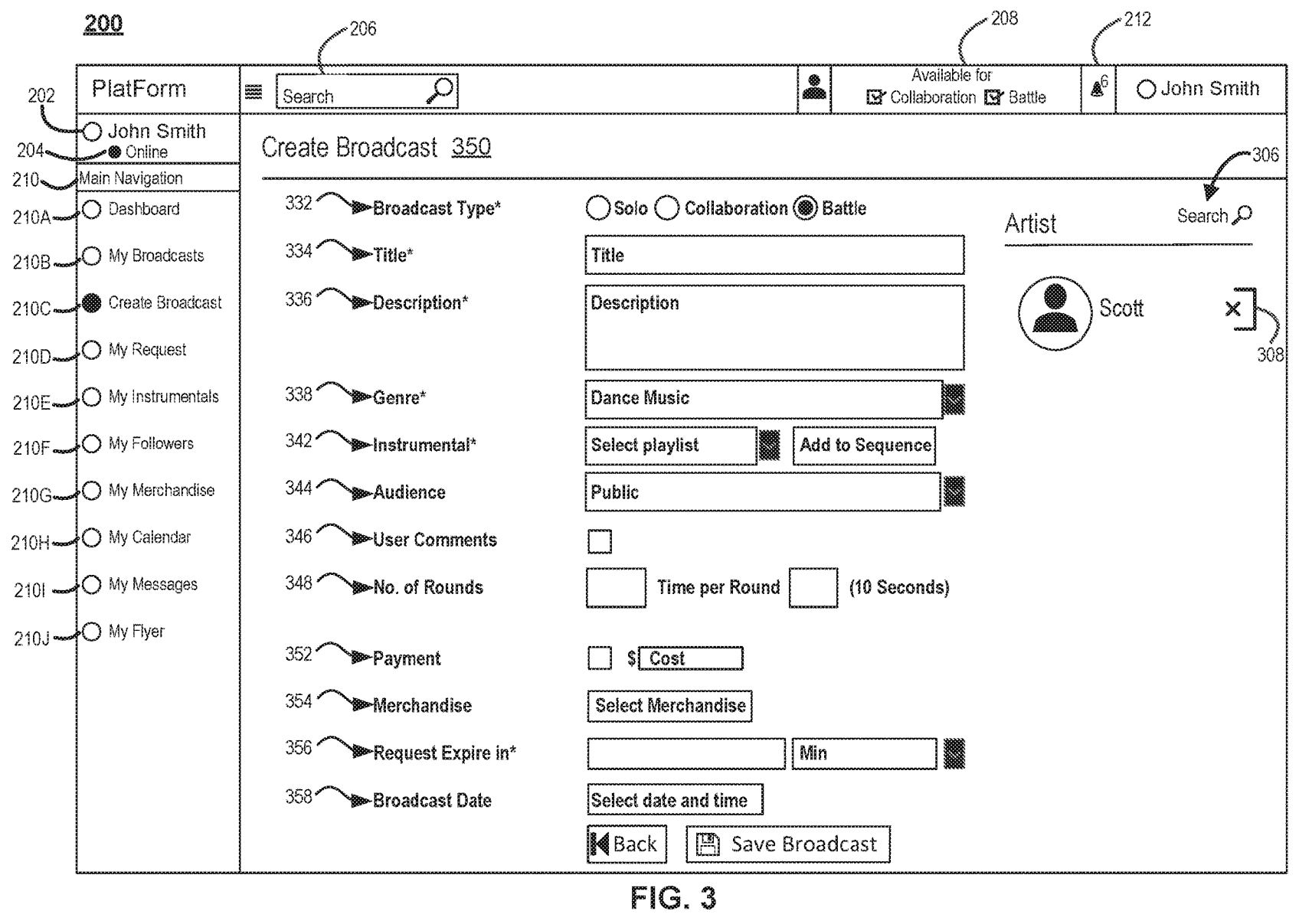
Figure 5:
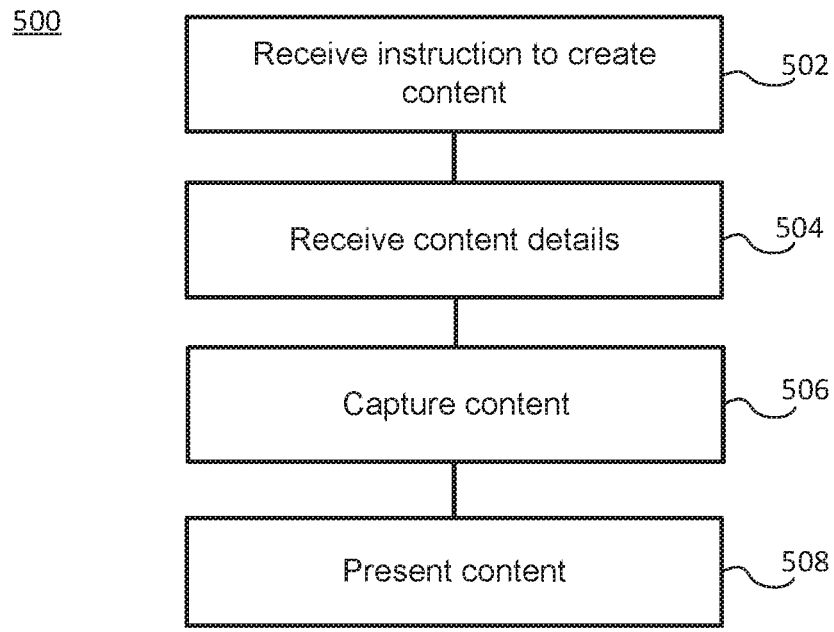
FIG. 5 illustrates a method for creating and presenting content, in accordance with various embodiments.

In various embodiments, content may be created and presented in any suitable manner, for example, by method 500 depicted in FIG. 5. With combined reference to FIGS. 1, 3, and 5, the user may select an input device 145 in user profile 110 (e.g., user profile 200) to create content. For example, the user may select create broadcast tab 210C in main navigation pane 210 to create a video/audio for broadcast. Processor 102 may receive the instruction to create content (step 502) from the user's selection and may direct the user to the appropriate GUI 130 or screen. For example, the user may be directed to create broadcast screen 350, as shown in FIG. 3.

In various embodiments, the user may enter details or information about the content to be created, and broadcasting platform 100 and/or processor 102 may receive the content details (Step 504). Examples of content details for a broadcast are shown on create broadcast screen 350 in FIG. 3. The user may select a broadcast type 332 by selecting one of the options (solo broadcast, collaboration, or a battle). A solo broadcast may be a broadcast which is completed only by the user on the associated user profile 110 (i.e., there is not another user and his or her respective user profile 110 participating in the broadcast). A collaboration may involve more than one user, through their respective user profiles 110 on broadcasting platform 100, communicating with one another to create the content and/or broadcast, such as in a split screen configuration showing two users through two different user profile 110 contributing to the collaboration. A collaboration may take place when the users wish to create common content by utilizing the expertise of each user (e.g., one user provides music while the other sings, raps, or provides other lyrics to the provided music). The different users may contribute their portions of a collaboration at the same time or at different times (e.g., one user may record an instrumental track, and another user may record vocals at a different time, for example, as the instrumental track is performed by broadcasting platform 100). Another example of a collaboration may be a karaoke-like event, in which a user provides the music to a song and another user sings, wherein additional users may sign up to perform subsequent songs (e.g., one-after-another), with the same musician and/or singer, or all new users. A battle may be a broadcast which involves more than one user who, through their respective user profiles 110 on broadcasting platform 100, compete with one another. For example, in a split screen configuration (e.g., one user pictured on one side of display screen 122, and the other user pictured on the other side of display screen 122, the users may take turns performing (e.g., rapping, playing an instrument) for a number of "rounds," which may be timed. Each participant may have a turn during each round of the battle. There may be a moderator for a battle, who awards points for each round and/or decides the winner at the end of the battle, and/or the winner may be decided by an audience of users viewing the battle broadcast on broadcasting platform 100 through their respective user profiles 110 (e.g., by voting the winner of each round and/or the entire battle).

In various embodiments, as part of the content information received by broadcasting platform 100 and/or processor 102 for user creation of content, the user may enter a title 334 and/or description 336 by typing in words, numbers, and/or symbols into respective text boxes. The user may select a genre 338 of the broadcast (e.g., from a dropdown menu). For example, if the broadcast is a musical broadcast, the user may select a music genre. There may be multiple genres available for the user to input into create broadcast screen 350, such as a more general genre, such as the type of entertainment (e.g., music, acting, comedy, etc.). The user may select an audience in audience section 344, by for example, selecting an option in a dropdown menu. The user may make the broadcast public, private (e.g., no one may view the broadcast except the participants in the broadcast), available to a specific user(s), a type of user, or a group of users, or the like. The user creating the broadcast may select whether users viewing the broadcast may make comments (via communication system 140), for example, by selecting user comments section 346, during or after the broadcast. Also, the user may indicate whether viewing the broadcast will cost money (e.g., by checking the box and indicating a price to view in payment section 352). Ticketing may be completed by the user, through the associate user profile 110, offering tickets to a broadcast to the selected audience, and payment processor 60 facilitating the transfer of monetary funds or the equivalent (e.g., a digital currency use on broadcasting platform 100).

In various embodiments, if a user wishes to use instrumental tracks for the broadcast, the user may indicate so in instrumental section 342. The user may select, for example, from a dropdown menu of the user's instrumentals (which may be viewed or accessed from instrumentals tab 210E), or instrumentals belonging to other users of platform to which user has been granted access and permission, for a battle broadcast as depicted in FIG. 3. The user may select multiple instrumental tracks in instrumental section 342 to create a sequence, for example, for the users involved in the broadcast to rap over. Continuing with the battle broadcast example, the user may select a number of rounds in rounds section 348, during which the participants will take turns performing, and indicate the time per round (e.g., 30 seconds per round) (rounds section 348 may not be present in the content information input devices (e.g., sections 332-358) for a collaboration or solo broadcast).

In various embodiments, the user may select the date and time that the broadcast may be available for viewing in broadcast date section 358. The broadcast may be live or pre-recorded. Once all participants are ready to record, the participating users may create the content to be broadcast, and then broadcast the created content when desired (e.g., live, at a certain date/time in the future, etc.). The user may also select merchandise in merchandise section 354, which will be pictured or advertised during the presentation of the broadcast (the merchandise may also be viewed or accessed through merchandise tab 210G of main navigation pane 210).

All the information entered by the user in sections 332-358 of create broadcast screen 350 (each of which may be an input device 145) may be received by broadcasting platform 100 and/or processor 102 and associated with the broadcast that is created. Once the information for the content (the broadcast in this example) is entered by the user and received by broadcasting platform 100 and/or processor 102, the user(s) involved in the creation of the content may instruct broadcasting platform 100 and/or processor 102 to capture the content to be created. Broadcasting platform 100 and/or processor 102 may capture the content (step 506) by video and/or audio recording via camera system 124 and/or a microphone on web client 120.

In various embodiments, the content may be presented (step 508) to the selected audience, for example, live. In various embodiments, the captured content may be stored in broadcasting platform 100 and/or in content database 70, and may be presented (e.g., broadcast) to the selected audience at a designated time after capture. A notification may be sent to all potential audience members that the user creating the content has selected as audience members in audience section 344, indicating that there is content being presented and/or ready for viewing/playing. In various embodiments, the content being presented may be streamed to the user audience member, or the user may download the content on their respective web client 120, and view/play the content after download. In various embodiments, users given access as audience members to the content may indicate to broadcasting platform 100 and/or processor 102 that they would like to view the content by selecting an input device 145 indicating the same (e.g., an RSVP button, or the like). That way, the content creator(s) may have an estimate of how many users of broadcasting platform 100 may view the content when made available at a certain time. In various embodiments, the created content may be available on the creating user's user profile 110 to the selected audience for viewing/playing whenever another user would like to view/play the content. The viewing user may visit the creating user's user profile 110, and select a play/view button so processor 102 presents the content. There may be indicators for each piece of created content indicating the number of views, likes, shares, comments, or the like completed by other users.

In various embodiments, system 50 may allow the sharing on social media of content created and/or stored on broadcasting platform 100 and/or content database 70 (e.g., Facebook®, Twitter®, or the like). An input device 145 may be presented on GUI 130, and in response to a user selecting this input device 145, processor 102 may transmit the associated or selected content from system 50, or a link to access the content, to the desired social media website for sharing.

In various embodiments, any content may be created and presented by the steps of method 500 (e.g., video, audio, audiovisual, pictorial, or the like, which may not necessarily be broadcasted).

Figure 6:
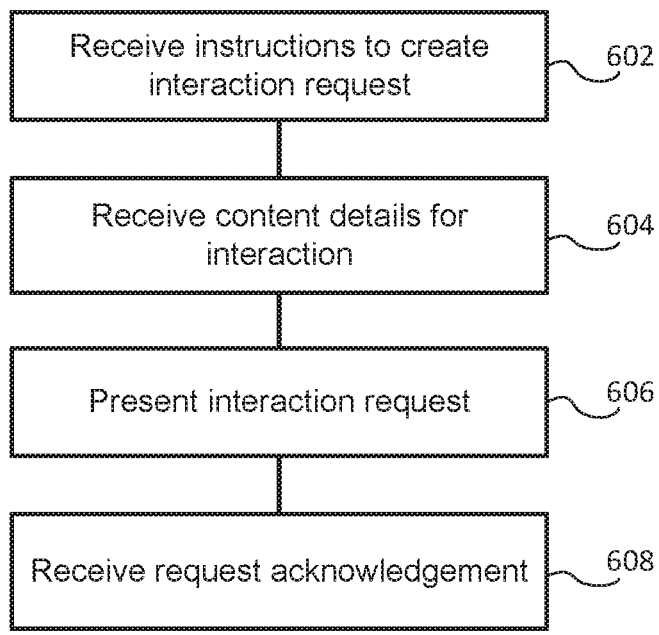
FIG. 6 illustrates a method for facilitating an interaction between users on a broadcasting production system, in accordance with various embodiments.

For content involving more than one user's involvement (i.e., more than on user profile 110), participation by both or all involved users through their respective user profiles 110 may be necessary. Accordingly, FIG. 6 illustrates a method 600 for facilitating an interaction between users on a broadcasting system to create content. With combined reference to FIGS. 1, 3, and 6, as part of receiving content details (step 504 in method 500 of FIG. 5) for content to be created by a user, for content requiring more than one user profile 110 participation (e.g., collaboration or battle), the user may instruct broadcasting platform 100 and/or processor 102 to create an interaction request (e.g., a battle request or collaboration request) for at least one other user of broadcasting platform 100 to participate in the content creation, and broadcasting platform 100 and/or processor 102 may receive the instructions to create an interaction request (step 602). Accordingly, the user may identify another user to participate in the content creation, for example, by searching in artist search 306. The user may locate and select the artist desired to participate in the collaboration or battle (artist Scott 308 in this example), to whose user profile 110 the user will transmit an interaction request, which the other user may acknowledge (i.e., accept or decline). An interaction request may also be sent to numerous users, groups of users, and/or types of users, which processor 102 may identify by the characteristic representing the user type in the user profiles 110 (e.g., rappers to create a rap battle broadcast). An interaction request may also be sent to all users. An interaction request sent to multiple users may have a limitation placed on it as to how many other users may accept the interaction request, a priority logic of who will participate if multiple users accept (e.g., the user may indicate that certain users are preferred over others, first-come-first-served, etc.), or the like.

An interaction request may comprise the content details about the content to be created. Therefore, broadcasting platform 100 and/or processor 102 may receive the content details for the interaction (step 604), which may be the same or similar to the content details received in step 504 of method 500. In request expiration section 356 of create broadcast screen 350, for example, the user creating the content and the interaction requests to artist Scott 308 may indicate a date and time that the interaction request for the other user (e.g., artist Scott 308) may expire. Therefore, if the recipient of the interaction request does not accept or decline the interaction request by the expiration date/time dictated in request expiration section 356, broadcasting platform 100 and/or processor 102 may rescind and/or delete the interaction request, or transmit the interaction request to another user who the creating user indicated would be a subsequent choice.

In various embodiments, in response to the required or adequate content details being received by broadcasting platform 100 and/or processor 102 (e.g., through create broadcast screen 350), and/or in response to the user instructing broadcasting platform 100 and/or processor 102 to transmit the interaction request to the appropriate recipients, broadcasting platform 100 and/or processor 102 may transmit and present the interaction request (step 606) to the recipient(s). The recipient(s) may be notified of the received interaction request by a notification (e.g., a notification symbol 212 or alert, such as a push notification, popup textbox, or the like). The receiving user may acknowledge the interaction request by accepting or declining the interaction request, and broadcasting platform 100 and/or processor 102 may receive the acknowledgement (step 608). The acknowledgement may be transmitted to the user profile 110 of the creating user. In various embodiments, the receiving user may acknowledge the interaction request, but modify the content details (e.g., the date/time, genre, audience, etc.) and transmit the modified interaction request to the creating user to see if the modified content details are acceptable to the creating user. In response, it may be the creating user's responsibility to acknowledge the modified interaction request similarly as described herein.

In various embodiments in which a user has sent an interaction request to multiple other users of broadcasting platform 100, in response to one of the receiving users' acceptance of the interaction request, the creating user may approve or decline the receiving user's acceptance. This allows the creating user to decide who of the users who accepted the interaction request will create the content with the creating user, and also prevents the user from overcommitting to too many other receiving users if multiple users accept the interaction request.

In response the interaction request being accepted by both or all contributing users, the content may be captured (step 506 in method 500 of FIG. 5) upon instruction to broadcasting platform 100 and/or processor 102 by one or all participating users, and saved, broadcasted, made available, or the like.

Figure 4:
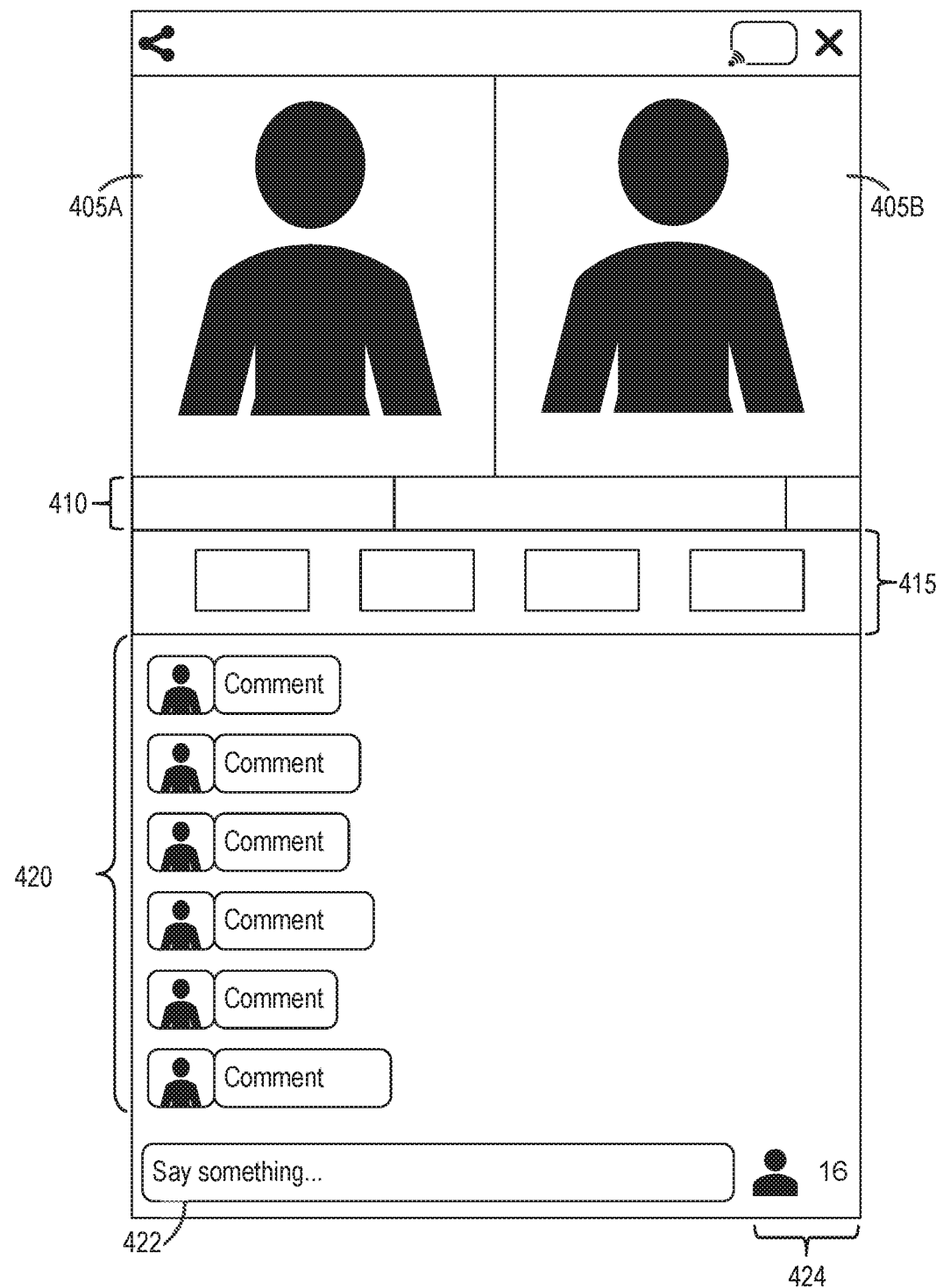
FIG. 4 illustrates a display screen on a web client depicting yet another exemplary GUI of a broadcasting production system, in accordance with various embodiments.

In accordance with various embodiments, and with combined reference to FIGS. 1 and 4, FIG. 4 depicts screen 400, which may be displayed on display screen 122 via GUI 130, with or for the creation of content involving an interaction between two user profiles 110, first user (or first user profile) 405A and second user (or second user profile) 405B, of broadcasting platform 100. In screen sections 410 and 415, interaction and/or content details may be displayed such as the content title, description, number of rounds (if a battle), or any other information, such as that depicted and input by a user on create broadcast screen 350 in FIG. 3. Screen sections 410 and 415 may additionally or alternatively comprise links to social media platforms, links to a payment processor 60 to purchase merchandise, pictures or links to merchandise, indicators of the number of present viewers, views, likes, comments, shares, etc., and/or the like. The content details depicted in screen sections 410 and 415 may be dictated, at least in part, by the content details entered on, for example, create broadcast screen 350 in FIG. 3. Comments section 420 may allow viewing users (i.e., audience members) to comment on the content, for example, by providing feedback, adding commentary, scoring a round of a battle, critiquing the content or users, or the like. During a live broadcast of content being performed or created by first user 405A and second user 405B, the comments in comment section 420 may be live. A viewing user may enter a comment in comment box 422 to be presented in comment section 420. Audience members may also score battle rounds, and/or provide votes for a winner.

In a battle broadcast or other content type, as discussed, there may be a predetermined number of rounds, each round having a predetermined duration. Therefore, in response to receiving instructions from first user 405A and second user 405B, broadcasting platform 100 and/or processor 102 may start a first turn of the first round for first user 405A. The first turn of the first round may commence by starting timer 150 set with the predetermined duration and providing video and/or audio streaming and/or recording of the first user 405A via the camera system 124 and microphone of first user's 405A respective web client 120. In response to timer 150 going for the predetermined round time for first user 405A (i.e., timer 150 expires for the first turn of the first round), processor 102 may indicate that first user's 405A turn is over and/or take any other suitable action (e.g., mute audio or disable audio content capturing for first user 405A, stop background instrumental or other audio or effects, and/or stop recording or displaying video (because first user's 405A turn is over in the present round)). Processor 102 may display a warning for some time (e.g., five seconds) before expiration of timer 150 for a user's turn during a battle to warn the user that the turn is almost over. In response to expiration of first user's 405A turn in the first round, broadcasting platform 100 and/or processor 102 may start a second turn of the first round for second user 405B. The second turn of the first round may commence by starting timer 150 set with the predetermined duration and providing video and/or audio streaming and/or recording of the second user 405B via the camera system 124 and microphone on second user's 405B respective web client 120. In response to timer 150 going for the predetermined round time for second user 405B (i.e., timer 150 expires for the second turn of the first round), processor 102 may indicate that second user's 405B turn is over and/or take any other suitable action (e.g., mute audio or disable audio content capturing for second user 405B, stop background instrumental or other audio or effects, and/or stop recording or displaying video (because second user's 405B turn is over in the present round)). In various embodiments, before starting a turn during a round, timer 150 and/or processor 102 may provide a countdown and/or a visual or audio indicator so that the respective user knows when to start their turn. There may be delays during a round between the participants' turns to allow spectator contributions, for example, comments, commentary, feedback, and/or the like.

In response to a round being completed (i.e., both or all users have had their turn), a moderator may provide a score, comments, or other feedback, or audience members may provide comments/feedback, or vote on who won the round. Processor 102 and timer 150 may repeat the process described above for turns and rounds during a battle until the predetermined number of rounds are complete (or for any desired number of turns or rounds).

Overall, system 50 and broadcasting platform 100 allows users, through user profiles 110, to share all sorts of content, and to collaborate and interact with one another to facilitate artistic expression and advancement. Broadcasting platform 100 further allows users thereof to view content, for example, live content, such that broadcasting platform 100 offers a digital stage for users to perform live to much larger audiences than a physical venue would allow. In that regard, broadcasting platform 100 brings the brick-and-mortar performing stage and/or live stage to the users through their respective web clients 120, along with the brick-and-mortar studios where content is created (e.g., a collaboration session between multiple user profiles 110 viewable to other users). Furthermore, users sharing content (e.g., live content) may also be performing at a physical venue made for audiences, so the location (and other content details, such as those discussed in relation to FIG. 3) of such a performance may be entered into broadcasting platform 100, and mapping system 80 may indicate the location of such a performance to a user search for live performances in a certain geographic location, or having certain desired content details or characteristics. Broadcasting platform 100 thus allows users to follow, stay apprised of, view (live or prerecorded), interact with, and otherwise enjoy certain artists, content, interactions, genres of entertainment (e.g., music, art, videography, etc.), and the like.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a user (ii) a user profile, and/or (iii) user information. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

Referring to FIGS. 5-6, the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 5-6, but also to the various system components as described above with reference to FIGS. 1-4.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method are described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general-purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

As used herein, "transmit" (which may be used interchangeably as appropriate with "send") may include sending electronic data from one system component to another over a network connection. Additionally, as used herein, "data" may include encompassing information such as commands, queries, files, data for storage, and the like in digital or any other form.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACK-BERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

Phrases similar to a "payment processor" may include a company (e.g., a third party) appointed (e.g., by a merchant) to handle transactions. A payment processor may include an issuer, acquirer, authorizer, and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

Any communication, transmission, and/or channel discussed herein may include any system or method for delivering content (e.g. data, information, metadata, etc., for example, related to video, audio, text, images, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word™ or EXCEL®, an ADOBE® Portable Document Format (PDF) document, etc.), an "ebook," an "emagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   receiving, by a processor, content details associated with content to be at least one of created or shared through a first user profile;
   creating, by the processor, an interaction request comprising at least a portion of the content details;
   transmitting, by the processor, the interaction request to a second user profile;
   receiving, by the processor, an acknowledgement of the interaction request from the second user profile; and
   capturing, by the processor, the content through at least one of the first user profile or the second user profile, wherein the capturing the content comprises an interaction between the first user profile and the second user profile.

2. The method of claim 1, wherein the interaction between the first user profile and the second user profile comprises a collaboration, wherein the method further comprises:
   capturing, by the processor, a first portion of the content through a first of the first user profile and the second user profile;
   transmitting, by the processor, the first portion of the content to a second of the first user profile and the second user profile;
   performing, by the processor, the first portion of the content through the second of the first user profile and the second user profile; and
   capturing, by the processor, a second portion of the content through the second of the first user profile and the second user profile.

3. The method of claim 2, further comprising:
   broadcasting, by the processor, the first portion and the second portion of the content to a third user profile.

4. The method of claim 2, wherein the capturing the second portion of the content occurs simultaneously with the performing the first portion of the content.

5. The method of claim 1, wherein the interaction between the first user profile and the second user profile comprises a real-time communication, during which, the capturing the content occurs.

6. The method of claim 5, further comprising:
   displaying, by the processor, at least a portion of the first user profile on a first portion of a display screen;
   displaying, by the processor, at least a portion of the second user profile on a second portion of the display screen, wherein the capturing the content comprises:
providing, by the processor, a first turn for the first user profile for a first duration, during which a first user associated with the first user profile may provide first user content;
providing, by the processor in response to the first duration expiring, a second turn for the second user profile for a second duration, during which a second user associated with the second user profile may provide second user content.

7. The method of claim 6, wherein during the first turn, second user audio content capturing is disabled for the second user profile, and wherein the during the second turn, first user audio content capturing is disable for the first user profile.

8. The method of claim 6, further comprising:
providing, by the processor, a plurality of first turns, including the first turn, for the first user profile, wherein each of the plurality of first turns spans for the first duration, during which the first user associated with the first user profile may provide first user content;
providing, by the processor, a plurality of second turns, including the second turn, for the second user profile, wherein each of the plurality of second turns spans for the second duration, during which the second user associated with the first user profile may provide second user content,
wherein the plurality of first turns and the plurality of second turns alternate with one another such that there are no consecutive first turns and no consecutive second turns.

9. The method of claim 6, further comprising:
broadcasting, by the processor, the first turn and the second turn to a third user profile.

10. The method of claim 9, further comprising:
receiving, by the processor, a spectator contribution from the third user profile, wherein the spectator contribution comprises at least one of a comment, commentary, feedback, or a score.

11. A system, comprising:
a processor;
a tangible, non-transitory memory configured to communicate with the processor,
the tangible, non-transitory memory having instructions stored thereon that, in response to execution by the processor, cause the processor to perform operations comprising:
receiving, by the processor, content details associated with content to be at least one of created or shared through a first user profile;
creating, by the processor, an interaction request comprising at least a portion of the content details;
transmitting, by the processor, the interaction request to a second user profile;
receiving, by the processor, an acknowledgement of the interaction request from the second user profile; and
capturing, by the processor, the content through at least one of the first user profile or the second user profile, wherein the capturing the content comprises an interaction between the first user profile and the second user profile.

12. The system of claim 11, wherein the interaction between the first user profile and the second user profile comprises a collaboration, wherein the operations further comprise:

capturing, by the processor, a first portion of the content through a first of the first user profile and the second user profile;
transmitting, by the processor, the first portion of the content to a second of the first user profile and the second user profile;
performing, by the processor, the first portion of the content through the second of the first user profile and the second user profile; and
capturing, by the processor, a second portion of the content through the second of the first user profile and the second user profile.

13. The system of claim 11, wherein the interaction between the first user profile and the second user profile comprises a real-time communication, during which, the capturing the content occurs.

14. The system of claim 13, wherein the operations further comprise:
displaying, by the processor, at least a portion of the first user profile on a first portion of a display screen;
displaying, by the processor, at least a portion of the second user profile on a second portion of the display screen,
wherein the capturing the content comprises:
providing, by the processor, a first turn for the first user profile for a first duration, during which a first user associated with the first user profile may provide first user content;
providing, by the processor in response to the first duration expiring, a second turn for the second user profile for a second duration, during which a second user associated with the second user profile may provide second user content.

15. The system of claim 14, wherein the operations further comprise:
providing, by the processor, a plurality of first turns, including the first turn, for the first user profile, wherein each of the plurality of first turns spans for the first duration, during which the first user associated with the first user profile may provide first user content;
providing, by the processor, a plurality of second turns, including the second turn, for the second user profile, wherein each of the plurality of second turns spans for the second duration, during which the second user associated with the first user profile may provide second user content,
wherein the plurality of first turns and the plurality of second turns alternate with one another such that there are no consecutive first turns and no consecutive second turns.

16. An article of manufacture including a non-transitory, tangible computer readable storage medium having instructions stored thereon that, in response to execution by a processor of a processing machine, cause the processor to perform operations comprising:
receiving, by the processor, content details associated with content to be at least one of created or shared through a first user profile;
creating, by the processor, an interaction request comprising at least a portion of the content details;
transmitting, by the processor, the interaction request to a second user profile;
receiving, by the processor, an acknowledgement of the interaction request from the second user profile; and
capturing, by the processor, the content through at least one of the first user profile or the second user profile, wherein the capturing the content comprises an interaction between the first user profile and the second user profile.

17. The article of claim 16, wherein the interaction between the first user profile and the second user profile comprises a collaboration, wherein the operations further comprise:
    capturing, by the processor, a first portion of the content through a first of the first user profile and the second user profile;
    transmitting, by the processor, the first portion of the content to a second of the first user profile and the second user profile;
    performing, by the processor, the first portion of the content through the second of the first user profile and the second user profile; and
    capturing, by the processor, a second portion of the content through the second of the first user profile and the second user profile.

18. The article of claim 16, wherein the interaction between the first user profile and the second user profile comprises a real-time communication, during which, the capturing the content occurs.

19. The article of claim 18, wherein the operations further comprise:
    displaying, by the processor, at least a portion of the first user profile on a first portion of a display screen;
    displaying, by the processor, at least a portion of the second user profile on a second portion of the display screen,
    wherein the capturing the content comprises:
        providing, by the processor, a first turn for the first user profile for a first duration, during which a first user associated with the first user profile may provide first user content;
        providing, by the processor in response to the first duration expiring, a second turn for the second user profile for a second duration, during which a second user associated with the second user profile may provide second user content.

20. The article of claim 19, wherein the operations further comprise:
    providing, by the processor, a plurality of first turns, including the first turn, for the first user profile, wherein each of the plurality of first turns spans for the first duration, during which the first user associated with the first user profile may provide first user content;
    providing, by the processor, a plurality of second turns, including the second turn, for the second user profile, wherein each of the plurality of second turns spans for the second duration, during which the second user associated with the first user profile may provide second user content,
    wherein the plurality of first turns and the plurality of second turns alternate with one another such that there are no consecutive first turns and no consecutive second turns.

* * * * *